Figure 1:
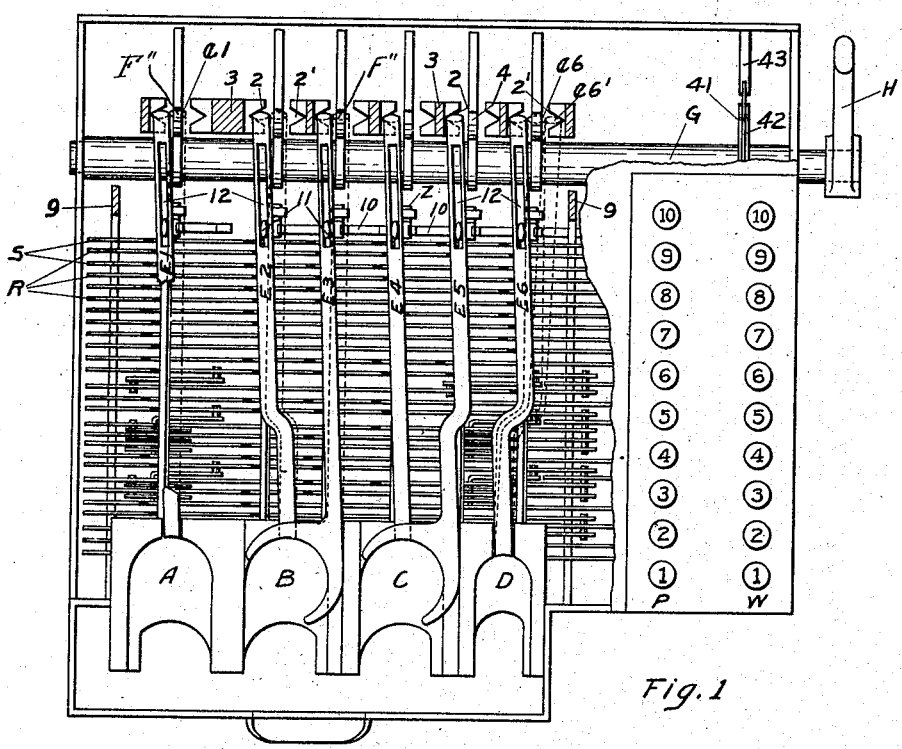

R. L. BAILEY.
CHANGE MAKING AND COMPUTING MACHINE.
APPLICATION FILED NOV. 1, 1912.

1,192,727.

Patented July 25, 1916.
3 SHEETS—SHEET 1.

Witnesses

Inventor
Robert L. Bailey
By
Attorney

R. L. BAILEY.
CHANGE MAKING AND COMPUTING MACHINE.
APPLICATION FILED NOV. 1, 1912.

1,192,727.

Patented July 25, 1916.
3 SHEETS—SHEET 2.

Witnesses

Inventor
Robert L. Bailey
Attorney

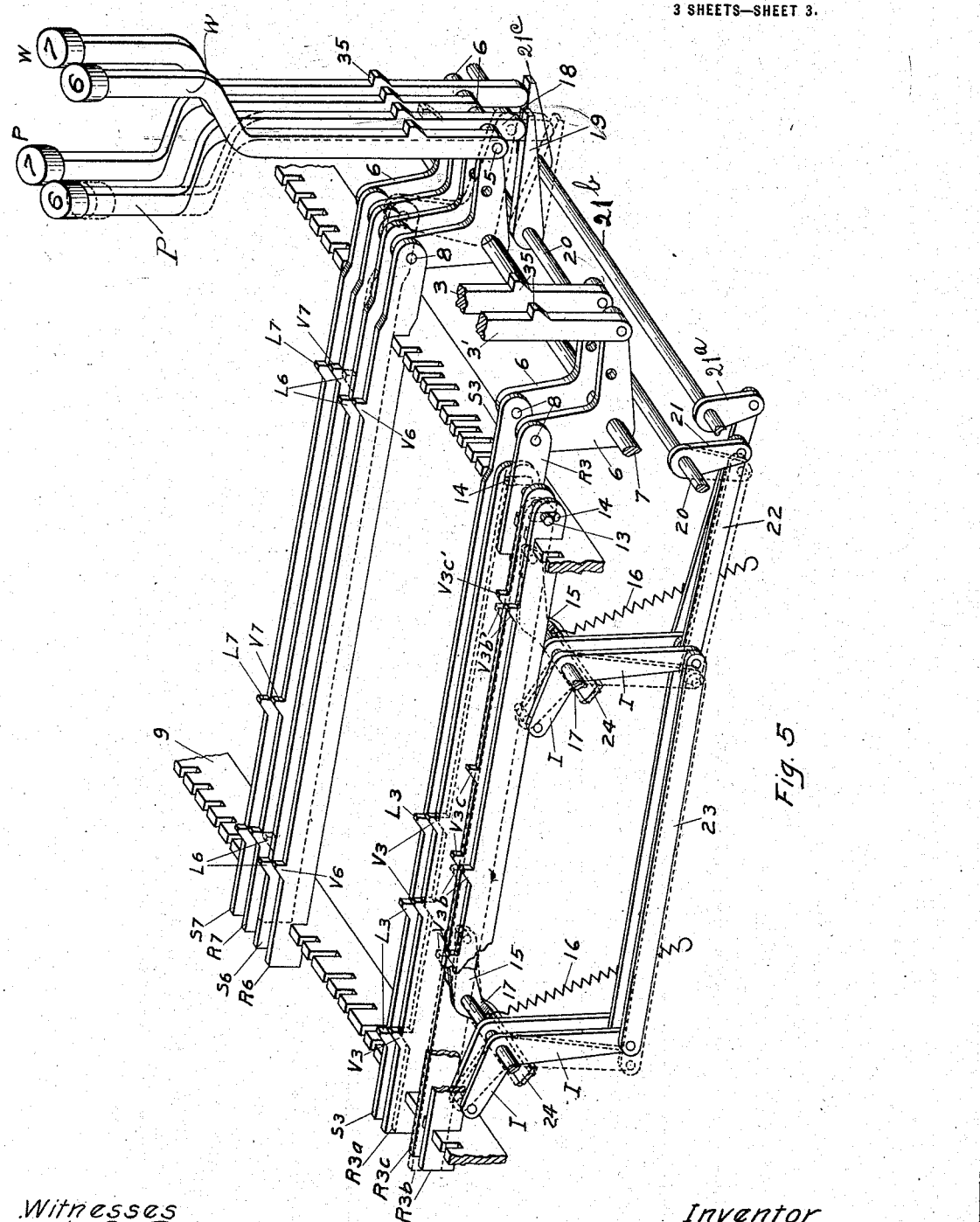

UNITED STATES PATENT OFFICE.

ROBERT L. BAILEY, OF PORTLAND, OREGON, ASSIGNOR, BY MESNE ASSIGNMENTS, TO INTERNATIONAL MONEY MACHINE COMPANY, OF TERRE HAUTE, INDIANA, A CORPORATION OF INDIANA.

CHANGE-MAKING AND COMPUTING MACHINE.

1,192,727.        Specification of Letters Patent.     Patented July 25, 1916.

Application filed November 1, 1912. Serial No. 729,093.

*To all whom it may concern:*

Be it known that I, ROBERT L. BAILEY, a citizen of the United States, residing at Portland, in the county of Multnomah and State of Oregon, have invented certain new and useful Improvements in Change-Making and Computing Machines, of which the following is a specification.

This invention embodies a machine designed particularly for use in establishments where money is handled in large quantities, such as mercantile establishments and stores generally, factories, and the like, the purpose of the machine being to automatically compute and deliver change.

The present machine is especially useful in establishments where money is tendered in payment for purchases, and it is necessary to calculate the difference between the amount of a purchase and the amount tendered, such difference representing the amount of change due a purchaser and which will be delivered to him in the operation of the machine herein described.

This invention relates to money handling broadly, however, and comprises a machine capable of use for selecting and delivering change either with, or without the operation of automatic computing or predetermining means, involving a subtracting action, as above premised, and including certain novel features of construction set forth in United States Letters Patent No. 985,136, issued to Thomas Bilyeu and William S. Overlin.

While the present invention, as described in detail hereinafter, may be used alone as a computing machine, it is contemplated to associate therewith any well known type of registering, indicating, and printing or recording devices, many of the latter of which are in common use today on cash registers, adding and similar machines. Such combinations of mechanisms would depend on the particular purposes or uses to which a machine of this class is put.

In carrying out the invention, it is contemplated to employ suitable receptacles for coins, or in the event paper currency is to be handled by the machine, money holders capable of receiving or delivering such currency would be employed, peculiar selecting and ejecting means for the delivery of the requisite amount of change, and predetermining means in the form of separately operable manipulative devices, one of which is operable to set certain selector means for the delivery of a desired amount, and the other of which, in the broader phase of this invention, re-adjusts the previously set selector means to re-determine the amount of coin or money which will be finally delivered from the machine and, of course, representing a different amount from that initially selected.

The re-adjustment of the first actuated selector mechanism is proposed in the present invention to effect an elimination of selected ejectors, or in other words, it will render the delivery devices set in an operative position inoperative, thus performing what may be called the subtracting operation hereinbefore referred to. Said re-adjustment, however, is not confined to the performance of a subtracting operation but may reside in the re-arrangement of the selector and delivery means, whereby the ultimate automatic computing action would involve addition or other arithmetical operations.

Still another important feature of the present machine resides in the special means employed whereby, when one of the selector or delivery mechanisms has been set for operation, a certain portion of said mechanism may subsequently be rendered inoperative and another portion permitted to remain undisturbed, and still another portion caused to be thrown from an inoperative to an operative position. It is by the instrumentalities for accomplishing the above that the special computing action is obtained for facilitating handling to best advantage of change elements of different denominations, as will be more fully disclosed hereinafter.

With the above and other objects in view, a full comprehension of the details of construction of this invention will be obtained by reference to the following description and to the accompanying drawings, in which—

Figure 2:
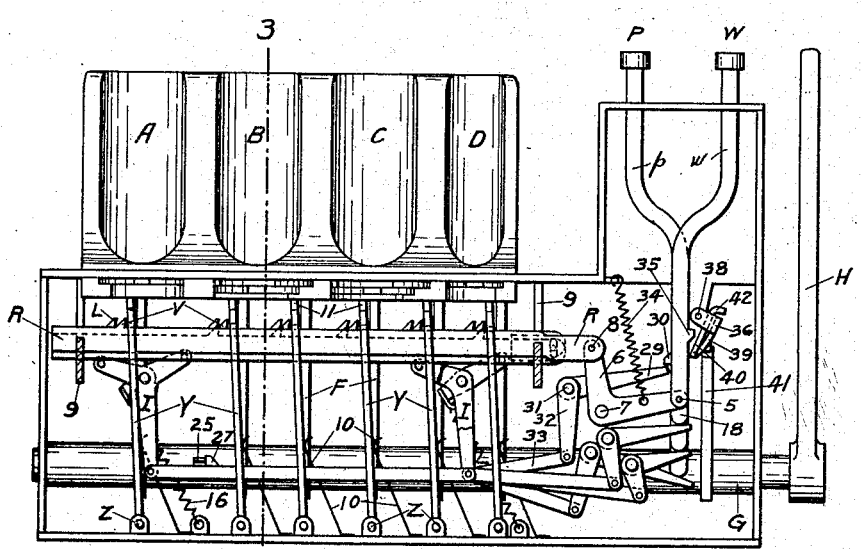
Figure 3:
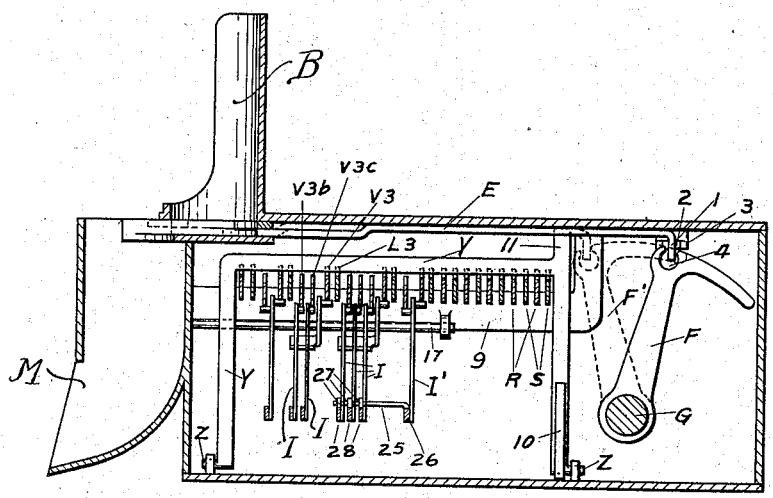
Figure 4:
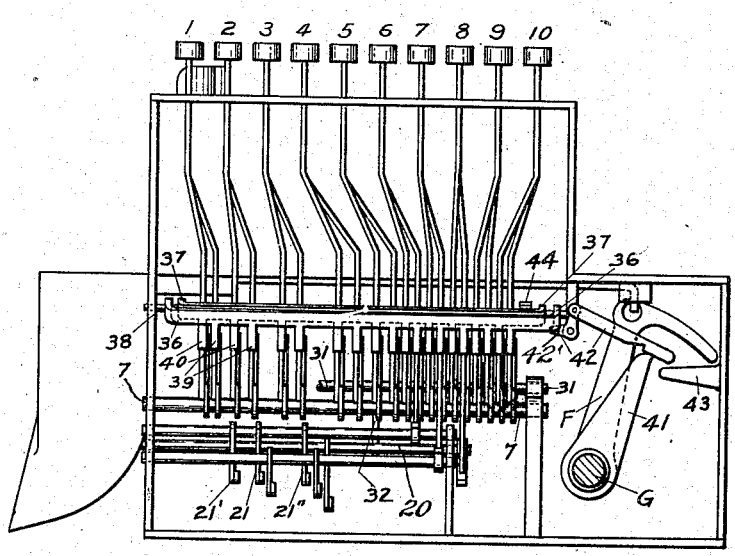

Figure 1 is a plan view of a machine embodying the invention with the coin receptacles removed, and a part of the top cover plate broken away to show the interior mechanism. Fig. 2 is a front elevation of the same with the front wall broken away. Fig. 3 is a sectional view taken about on the line 3—3 of Fig. 2. Fig. 4 is an end elevation of the machine with the end wall removed and rock shaft in section. Fig. 5 is a perspective view showing more clearly the peculiarities in the arrangement and construction of the selector mechanism, the manipulative devices coacting therewith and the intermediate connections.

Throughout the following detail description and on the several figures of the drawings, similar parts are referred to by like reference characters.

While the present machine, as herein described, and as illustrated, is adapted for making change in one and five dollar units from one to ten dollars inclusive, and for computing and paying the difference in change between any two given amounts within the limits mentioned, it will be understood that the principle of operation of said machine may be carried out in the provision of a machine adapted for performing the functions described in handling coin or money of practically all denominations, a duplication of the parts merely being involved in accomplishing the desired result.

Generally speaking, the present invention involves certain details and arrangement of parts heretofore well known in this art in their broad aspect and certain of which are shown in the patent hereinbefore mentioned.

In the drawings, suitable coin receptacles are designated A, B, C and D, the receptacle A being adapted to contain one dollar pieces to be delivered one at a time; B and C, one dollar pieces to be delivered either one or two at a time, and D, five dollar pieces to be delivered one at a time. Coöperating with the said receptacles is delivery means comprising ejector mechanism and coöperating selector means. The ejector mechanism may be constructed so as to be used in connection with coin receptacles such as above referred to or for operation of money holders such as might be employed when paper currency is used in a machine of this type.

The ejector mechanism comprises ejectors $E^1$, $E^2$, $E^3$, $E^4$, $E^5$ and $E^6$, the same being associated with the coin receptacles A to D inclusive, and having one end arranged to deliver or eject a coin or coins from the lower end of said receptacles, the other end of each ejector being formed with a downwardly extending lug 1. A plurality of lock members 3 are arranged adjacent to the inner ends of the ejectors aforesaid, and are formed with locking recesses at opposite sides of each ejector and its lug 1, the normal positions of the ejectors being such that the lugs thereof are seated in the recesses of the member 3 at one side of the arms F of a main actuator comprising the rock shaft G and the operating handle H, the arms F projecting from said rock shaft and extending at their upper ends between adjacent recesses of the lock members 3. The arms F have at their upper ends notches F″ into engagement with which the lugs 1 of the ejectors are adapted to be moved by a bodily movement of the inner ends of the ejectors in the same plane as their ejecting movement. Obviously, when the lug 1 of an ejector has been disengaged from a locking recess of a coöperating member 3, it may be moved into engagement with the notch F″ of the adjacent arm F and thus arranged so that, on operation of the actuator G, the ejector will be operated. The arrangement of the recesses of the members 3, however, is such that the ejectors are adapted to be moved so that the lugs 1 may not only be drawn into engagement with the notches F″, but may receive a further movement in the same direction so as to pass entirely through said notches F″ into engagement with recesses opposite those in which said lugs 1 normally rest. The recesses of the members 3 are therefore adapted to lock the ejectors from movement when the latter are positioned inoperatively on either of opposite sides of the arms F. The extent of movement of the arms F is shown by dotted lines at F′ in Fig. 3, and such movement, of course ejects coins from those coin receptacles, the ejectors of which have been previously selected or rendered operative.

Beneath the ejectors $E^1$ to $E^6$, inclusive, and arranged transversely relative thereto, are yokes Y pivotally mounted at Z and the upper portions of which are provided with projections 11 that enter slots 12 in the ejectors. By pivotal movement of the yokes Y, one or more of the ejectors $E^1$ to $E^6$, inclusive, is adapted to be moved laterally at its inner end into engagement with a notch F″ of an adjacent arm F or into a recess of a member 3 opposite that recess with which said ejector is normally engaged. The yokes Y form members of selector means for the said ejectors, and springs 10 engage the yokes so as to normally hold the ejectors in their normal inoperative positions. The selector means comprehends independently operable manipulative devices comprising separative series of keys designated P and W. The keys $p$ and $w$ are numbered from 1 to 10, inclusive, and each comprises a stem suitably mounted for vertical movement in the casing of the machine. The keys of the series P are so numbered that any given key indicates the amount of money controlled by it for the purpose of delivery from the machine. Said series P of keys are operated according to the amount of money tendered by a purchaser, in so far as the relation of this series of keys to the series W is concerned. The series W of keys are operated according to the amount of a purchase or sale, or an amount which is to be deducted from that previously selected by a key of the series P. The manipulative devices P and W are so arranged and connected with other parts of the selector means as to permit of operation of the keys of the series P independently of those of the series W, whereby the machine may be used for delivering coin of predetermined amounts without involving any automatic computing action.

Describing more fully the computing functions or coöperation of the manipulative devices P and W, it will be noted that the keys $p$ and $w$ are pivotally connected at their lower ends at 5 to bell crank levers 6 of the shaft 7, said levers having operative connection at 8 with selectors S and R, which are slidable horizontally in transverse guides 9, the latter being notched to receive the selectors.

For the purpose of more clearly understanding the peculiar action of the various selectors, the same will be divided into classes, those designated S comprising a main selector mechanism coöperating with the keys of the series P, and those designated R comprising an auxiliary selector mechanism which includes primary and secondary selectors. The various selectors are provided with lugs on their upper edges to engage with the yokes Y for shifting the latter and thereby placing predetermined ejectors in operative position. The selectors are adapted to move a given distance horizontally upon actuation of the manipulative devices coöperating therewith, but only one-half of said horizontal movement is required to move a yoke Y a sufficient distance to place its associated ejector in operative engagement with an ejector arm 4. The yoke actuating lugs L of the selectors S comprising the main selector mechanism are therefore so arranged that one-half of their horizontal movement is accomplished before engagement is had with the yokes Y, the latter half of their movement causing the ejectors coöperating therewith to be placed in delivery position, such position being shown by dotted lines $A^1$ and $A^6$ in Fig. 1.

In Fig. 2, it will be observed that certain lugs V of the selectors R included in the auxiliary selector mechanism, are in engagement with the yokes Y when the latter are in their normal positions, so obviously, if a key of the series W be depressed the entire horizontal movement of its associated selector R will be transmitted to coöperating yokes Y and the ejectors connected with said yokes will pass from the normal inoperative position to a similar inoperative position on the opposite side of the ejector arms which causes the lugs 1 of said ejectors to move from one of the locking recesses of a member 3 to an opposite locking recess.

Describing the operation of the main and auxiliary selector mechanisms in detail and referring particularly to the specific reference designations on Fig. 5, the main selector $S^6$ is provided with two lugs $L^6$ and will be operated by depression of key 6 of series P so as to be moved into dotted line position, shown in said figure, the lugs $L^6$ causing their respective yokes Y to move the associated ejectors $E^1$ and $E^6$ into delivery positions so that if the handle H is turned, said ejectors will deliver a silver dollar and a five dollar gold piece from the machine into the chute M. Should the key 6 of the series W be depressed before the actuator G is operated, as above described, the auxiliary selector $R^6$ connected to the last mentioned key will engage the yokes Y previously operated by the main selector $S^6$, and move said yokes to place their coöperating ejectors in a second or inoperative position so that the actuator, if operated, will not effect a delivery of any money since the auxiliary selector $R^6$ has lugs $V^6$ that are adapted to coöperate with the same yokes as the lugs $L^6$. The auxiliary selectors $R^6$ having the direct coöperation in the manner above described, are termed herein "primary selectors" to distinguish them from the secondary selectors later to be described.

The transaction above described is the subtraction of six dollars from six dollars, and the subtraction of one dollar from six dollars would be accomplished in a similar manner by a primary selector which would render inoperative, however, only the ejector $E^1$ so that the five dollar ejector $E^6$ will be operated to eject the desired amount of money.

When it is desired to subtract two, three or four dollars from six dollars initially selected, it is required that the five dollar selector be eliminated or rendered inoperative and the one dollar selectors substituted therefor. In other words, an interchange in the denominational selecting action of the main and auxiliary selectors is made necessary, and the present invention accomplishes this by simple effective means, now to be described.

As an example, the action of the parts in the operation of subtracting three dollars from six or seven dollars will be set forth, and still referring to Fig. 5, it will be seen that the main selector $S^3$ associated with the key stem 3 of the series P is provided with three lugs $L^3$ for the selection of three one-dollar selectors $E^1$, $E^2$ and $E^3$. Associated with the main selector $S^3$ is an auxiliary selector mechanism comprising a primary selector $R^{3a}$ and secondary selectors $R^{3b}$ and $R^{3c}$. The primary selector $R^{3a}$ is designed for direct coöperation with the ejectors, as described in reference to the selector R⁶. In other words, said primary selector R³ᵃ is connected with the key stem 3' of the key designated 3 of series W so that, if three dollars is initially selected, by operation of key 3 of series P, said three dollars may be directly eliminated for a subtraction operation by actuation of the key 3' of series W. In subtracting three dollars from six dollars, the initial depression of the key 6 of series P not only moves the selector S⁶ to place the ejectors E' and E⁶ in an operative position, but the lower end of the key 6 of series P engages and depresses an arm 19 of shaft 20, said shaft 20 having an arm 21 connected by links 22 and 23 with bell cranks I, the upper arms of which carry lateral pins engaging the lower portion of the secondary selector R³ᵇ. The bell cranks I are mounted on the shafts 17 and on said shafts are mounted also two bell cranks 15 coöperating with the primary selector R³ᵃ, the cranks 15 having arms 24 in the path of movement of the cranks I and normally holding the upper arms of the cranks I depressed by reason of the provision of springs 16 connected to said arms 24. The springs 16 hold the upper arms of the cranks 15 elevated.

The secondary selector R³ᶜ adjacent to the selector R³ᵇ is also in coöperation with parts I and links 22 and 23 equivalent to those above described, the link 22, however, being connected to an arm 21ᵃ on a shaft 21ᵇ having another arm 21ᶜ operable by the key 7 of series P in the same manner as arm 19 is operable by the key 6 of said series. The main selector S³ is therefore associated with the primary selector R³ᵃ and the secondary selector R³ᵇ, said selectors R³ᵃ, R³ᶜ and R³ᵇ being connected by a pin 13 which passes through vertical slots 14 in corresponding ends of said selectors. The pin 13 passes through a bar R³ directly connected to the lever 6 which is operated by the key stem 3'. By reason of the connection 13—14, the selectors R³ᵃ, R³ᵇ and R³ᶜ are adapted for simultaneous longitudinal movement and independent vertical movement and the bell cranks 15 normally holding the selector R³ᵃ elevated, operate reversely to the cranks I which normally support the selectors R³ᵇ and R³ᶜ in their lowermost positions, the range of relative vertical movement of the parts R³ᵃ, R³ᵇ and R³ᶜ being shown in Figs. 2 and 5.

Now reverting, on depression of the key 6 of series P, the movement of the parts 19, 21, 22, 23, 15 and I, is such that the selector R³ᵃ which is normally in the same horizontal plane as the selector S³, is lowered into an inoperative position and the selector R³ᵇ is elevated by its cranks I into a position in the same horizontal plane as said selector S³. The selector S³ has three lugs L³ to select three one-dollar pieces, whereas the selector R³ᵇ has three lugs, two of which, designated V³ᵇ are adapted to select two one-dollar pieces and the other of which, V³ᵇ' is adapted to engage and render inoperative the selector E⁶ for the five-dollar pieces. Thus, the depression of key 6 selecting a one-dollar piece and a five-dollar piece simultaneously, adjusts the primary selector R³ᵃ and the secondary selector R³ᵇ so that when subsequently the key 3 of series W is depressed, the selector R³ᵃ will be inoperative and the selector R³ᵇ will select the ejectors E² and E³ and eliminate or move into an inoperative position the ejector E⁶, whereby the operation of the actuator G will deliver three one-dollar pieces from the machine.

In respect to the subtraction of three dollars from seven dollars, the above operation is duplicated except that, when the primary selector R³ᵃ is lowered to its inoperative position by the bell cranks 15, those cranks coöperating with the selector R³ᶜ are elevated so that the last mentioned selector attends to the elimination of the ejector E⁶ from its operative position, the selector R³ᵇ not moving from its normal position when a key 7 of series P is actuated as above described.

In brief therefore, the denominational interchange involved in the operation of the selectors as just presented, includes essentially an initial selection by the main selector mechanism of change consisting of money of different denominations, a simultaneous adjustment of the primary and secondary selectors of the auxiliary selector mechanism, whereby a denominational interchange of the selected coins is effected, and a subsequent or final operation of the auxiliary selector mechanism to complete a re-adjustment of the previously and finally selected ejectors so that the latter will deliver the proper computed amount of change from the machine.

The subtraction of two, four or five dollars from six dollars is accomplished in a manner similar to that described in reference to three dollars, the shaft 20 having crank arms 21' and 21'', (see Fig. 4), in addition to the arm 21 for actuating the two and four dollar auxiliary selectors Rᵃ and Rᵇ. The bell cranks I' associated with the five dollar selectors R, are arranged to be actuated by means of the mechanism associated with the four dollar selector bars R, in regard to combinations up to and including eight dollars. For this purpose an arm 25, (see Figs. 2 and 3) on link 26 is adapted to be engaged and actuated by means of lugs 27 on links 28 of the four dollar mechanism. Associated with the key 9 of series P is a lever 29, (see Fig. 2) adapted to be actuated by a lug 30 on the stem of the key 9, said lever 29 being rigidly mounted on a crank shaft 31, having a crank arm 32 operatively connected by a link 33 to the bell crank levers I' of the five dollar selector bars R.

Springs 34 are attached to the bell crank levers 6 to hold the keys $p$ and $w$ and the selectors coacting therewith in their normal positions. The keys $p$ and $w$ are provided with lugs 35 near their lower ends, the latter being adapted to be engaged by fingers 39 on a locking bar 36 coacting with the keys $p$ and fingers 40 of a locking bar 37 coacting with the keys $w$. When the keys $p$ and $w$ are depressed they will be locked depressed by the respective bars 36 and 37, and not released until during the reverse movement of the actuator G. An arm 41 on said shaft engages and actuates a hook bar 42 that is connected with a bell crank lever 42' arranged to engage the bar 36 to lift the latter momentarily. When the bar 36 is lifted, it engages a lug 44 on the bar 37 and simultaneously lifts the latter, the fingers of the respective bars 36 and 37 being thus simultaneously disengaged from depressed keys $p$ and $w$. On the said inward or reverse movement of the arm 41 with the actuator G, the hook bar 42 strikes a trip member 43 and is thus released from operative engagement with said arm 41.

It is to be understood that the ejectors, with or without association with the selector mechanism constitute change delivery means. The term "change receptacles" used herein comprehends broadly any change holding means whatever, and such as might be employed for holding paper currency, whether or not the holder is of a receptacle type. The several mechanisms may be re-arranged to subserve compactness or economy of space, according to what may be best for the special uses to which the machine is to be put. Furthermore, it is obvious that the series P of manipulative devices in coöperation with their selectors, form a minuend selector mechanism, while the series W of said devices and coöperating selectors constitute subtrahend selector mechanism.

What I claim as new is:

1. In a money handling machine, the combination of minuend selector means comprising main selectors, manipulative devices for actuating the same, subtrahend selector means comprising separate sets of selectors, and means whereby, on operation of certain of the minuend selectors, certain of the subtrahend selectors will be rendered inoperative, and money ejecting means controlled by the selectors.

2. In a money handling machine, the combination of minuend selector means comprising main selectors, subtrahend selector means comprising primary and secondary selectors, manipulative devices for actuating the minuend selector means, separate manipulative devices for actuating the subtrahend selector means, and means whereby on operation of certain of the minuend selectors, operative primary selectors will be rendered inoperative, and inoperative secondary selectors will be rendered operative.

3. In a money handling machine, the combination of change receptacles, selectors, change delivery means, means for moving one of the selectors to render the change delivery means operative, and means for causing additional movement of said selector in the direction of its original movement, whereby to render said delivery means inoperative.

4. In a money handling machine, the combination of change delivery means, main selector mechanism comprising selectors, auxiliary selector mechanism comprising primary and secondary selectors, one of which is operative and the other normally inoperative, separate manipulative means for actuating the main and auxiliary selector mechanisms, and means for reversing the positions of the primary and secondary selectors when the manipulative means of the main selector mechanism is actuated.

5. In a money handling machine, the combination of change delivery means, a plurality of selectors horizontally slidable and coacting with the delivery means to render the latter operative, one of said selectors being normally elevated and the other normally inoperative in a lower plane than that first mentioned, and means for reversing the positions of the elevated and lowered selectors to vary the action of the change delivery means.

6. In a money handling machine, the combination of a plurality of sliding selectors arranged in different horizontal planes, ejectors adapted to be operated by the said sliding selectors, and means for rendering said uppermost selector inoperative and simultaneously raising the adjacent selector into operative position in relation to the ejectors.

7. In a money handling machine, the combination of selector mechanism comprising a plurality of main selectors, manipulative means for actuating the same, ejectors operable by said selectors on initial movement of the same, primary and secondary selectors, the primary selectors being normally adapted to coöperate with the delivery means while the secondary selectors are normally inoperative, and manipulative means for actuating the main selectors and simultaneously reversing the positions of the primary and secondary selectors with respect to the delivery means.

8. In a money handling machine, the combination of main selectors, ejectors normally operable thereby in a positive sense, auxiliary selectors consisting of primary members, the ejectors being normally operable by the primary members in a negative sense, said auxiliary mechanism also including secondary members normally inoperative in respect to the ejectors, separate manipulative means coöperating with the main and auxiliary selectors, and connections for causing the positions of the primary and secondary selectors to be reversed simultaneously with the operation of the manipulative means of the main selectors, and means whereby the primary selectors may be actuated without reversing the positions of the same with respect to the secondary selectors.

9. Selector mechanism for money changing machines comprising a plurality of horizontally slidable main selectors, a plurality of similarly mounted auxiliary selectors consisting of primary and secondary members arranged in different horizontal planes, separate series of manipulative keys connected with the main and auxiliary selectors, means whereby on operation of the manipulative keys of the main selectors, the relative positions of the primary and secondary selectors will be changed, and means permitting operation of certain of the primary selectors independently of the other primary selectors.

10. Selector means for money changing machine, the same comprising a primary selector, a secondary selector, means supporting said selectors in different planes and consisting of reversely arranged bell cranks, and means for actuating said bell cranks to reverse the relative positions of said primary and secondary selectors.

11. Selecting mechanism for money changing machines comprising a horizontally slidable primary selector, a pair of bell cranks engaging said selector at opposite ends, a secondary selector arranged in a different horizontal plane from that of the primary selector, a pair of bell cranks engaging the secondary selector at its opposite ends, and means for effecting simultaneous movement of the respective pairs of bell cranks to reverse the positions of the primary and secondary selectors.

12. Selecting mechanism for money changing machines comprising a horizontally slidable primary selector, a pair of bell cranks engaging said selector at opposite ends, a secondary selector arranged in a different horizontal plane from that of the primary selector, a pair of bell cranks engaging the secondary selector at its opposite ends, the pair of bell cranks engaging the primary selector being arranged reverse to those engaging the secondary selector, and means for imparting simultaneous movement to the respective pairs of bell cranks to reverse the relative positions of the selectors engaged thereby.

13. Selecting mechanism for money changing machines comprising a primary horizontally slidable selector, a pair of bell cranks engaging said selector at its opposite ends and formed with laterally extending arms, a secondary selector mounted similarly to the primary selector, a pair of bell cranks engaging the secondary selector and maintaining the same in a different horizontal plane from that of the primary selector, the said pairs of bell cranks being reversely arranged, and means for imparting movement to the bell cranks of the secondary selector to cause engagement thereof with the arms of the bell cranks of the primary selector, whereby the relative positions of said selectors are reversed.

14. In a money handling machine, the combination of change receptacles, ejectors therefor, means for shifting the ejectors from their inoperative to operative positions, selectors coöperating with said shifting means and arranged in different horizontal planes whereby certain of the selectors are operative and others inoperative with respect to the shifting means, manipulative means for actuating said selectors simultaneously, and means operable by said manipulative means for reversing the relation of the operative and inoperative selectors in respect to the shifting means.

15. In a money handling machine, the combination of change receptacles, ejectors therefor, means for shifting the ejectors from their inoperative to operative positions, selectors coöperating with said shifting means and arranged in different horizontal planes whereby certain of the selectors are operative and others inoperative with respect to the shifting means, manipulative means for actuating said selectors simultaneously, means operable by said manipulative means for reversing the relation of the operative and inoperative selectors in respect to the shifting means, and manipulative means for actuating the selectors after the positions thereof have been reversed.

16. In a money handling machine, the combination of change receptacles, ejectors therefor, yokes interlocking with the ejectors for shifting the same into and out of operative positions, selector means coöperating with said yokes and consisting of certain selectors operative in a horizontal plane, to engage and actuate the yokes, and other selectors operating in a different horizontal plane for engagement with said yokes, manipulative means for imparting simultaneous movement to the selectors in different horizontal planes, and means operable by said manipulative means for rendering the selectors, which are normally inoperative with respect to the yokes, operative.

17. In a money handling machine, the combination of change receptacles, ejectors therefor, yokes interlocking with the ejectors for shifting the same into and out of operative positions, selector means coöperating with said yokes and consisting of certain selectors operative in a horizontal plane to engage and actuate the yokes, and other selectors operating in a different horizontal plane for engagement with said yokes, manipulative means for imparting simultaneous movement to the selectors in different horizontal planes, and means operable by said manipulative means for rendering the selectors, which are normally inoperative with respect to the yokes, operative, and simultaneously rendering the operative selectors inoperative to actuate the yokes.

18. In a money handling machine, the combination of change receptacles, ejectors therefor, an actuator for said ejectors normally inoperative relative thereto, means for moving each ejector into a position in which it is operative by the actuator, and means for effecting further movement of said ejector in the direction of its original movement to render it inoperative by the actuator.

19. In a money handling machine, the combination of change receptacles, ejectors therefor, an actuator normally inoperative in respect to said ejectors, and means for effecting successive movements of each ejector in one direction whereby to place it in a position operative or inoperative in respect to the actuator.

20. In a money handling machine, the combination of change receptacles, ejectors therefor, an actuator comprising arms adapted to engage and operate the ejectors, locking means on opposite sides of each ejector for holding the same locked in an inoperative position with respect to its actuating arm, and means for moving said ejector by successive movements from locked position at one side of its actuating arm to a position operatively connecting it with said arm, and to a second position disengaging it from the arm and locking it from movement.

In testimony whereof I affix my signature in presence of two witnesses.

ROBERT L. BAILEY.

Witnesses:
THOMAS BILYEU,
J. M. CROOK.